(12) United States Patent
Yamamoto et al.

(10) Patent No.: US 8,403,653 B2
(45) Date of Patent: Mar. 26, 2013

(54) AXIAL FLOW FAN

(75) Inventors: Masato Yamamoto, Kyoto (JP); Kenichi Tanaka, Kyoto (JP); Ken Adachi, Kyoto (JP)

(73) Assignee: Nidec Corporation, Kyoto (JP)

( * ) Notice: Subject to any disclaimer, the term of this patent is extended or adjusted under 35 U.S.C. 154(b) by 1034 days.

(21) Appl. No.: 12/136,833

(22) Filed: Jun. 11, 2008

(65) Prior Publication Data

US 2009/0142204 A1  Jun. 4, 2009

(30) Foreign Application Priority Data

Jun. 12, 2007 (JP) .................................. 2007-154687

(51) Int. Cl.
*F04B 35/04* (2006.01)

(52) U.S. Cl. ............. 417/423.7; 417/423.14; 417/424.1; 417/424.2; 416/244 R; 310/62; 310/63

(58) Field of Classification Search .... 417/423.1–424.2, 417/366; 310/71, 157, 420, 62, 63; 416/244 R
See application file for complete search history.

(56) References Cited

U.S. PATENT DOCUMENTS

| | | | | |
|---|---|---|---|---|
| 4,659,290 A | * | 4/1987 | Kundert | 417/32 |
| 4,673,834 A | * | 6/1987 | Wrobel | 310/71 |
| 4,883,982 A | * | 11/1989 | Forbes et al. | 310/62 |
| 4,998,865 A | * | 3/1991 | Nakanishi et al. | 417/423.7 |
| 6,488,475 B2 | * | 12/2002 | Murata et al. | 417/32 |
| 6,511,303 B2 | * | 1/2003 | Obara | 417/423.12 |
| 7,218,515 B2 | * | 5/2007 | Vinson et al. | 361/679.48 |
| 7,259,486 B2 | | 8/2007 | Yamamoto | |
| 2003/0175124 A1 | * | 9/2003 | Hahn et al. | 417/44.1 |
| 2006/0250039 A1 | * | 11/2006 | Yamamoto | 310/90 |

FOREIGN PATENT DOCUMENTS

JP   2004-159421 A   6/2004

* cited by examiner

*Primary Examiner* — Charles Freay
*Assistant Examiner* — Christopher Bobish
(74) *Attorney, Agent, or Firm* — Keating & Bennett, LLP (57) ABSTRACT

In an axial fan including a motor, a substrate that connects the ends of a plurality of coils is disposed at a position axially under the bottom portion of a case with an axial gap therebetween. A spacer is interposed between the substrate and the bottom portion, and the substrate is fixed to the spacer. A plurality of through holes provided in the bottom portion are disposed in axial alignment with a plurality of through holes provided in the spacer. An air flow produced by rotation of an impeller at least partially passes through the interior of the case to be discharged to the outside of the case through the through holes in the bottom portion and in the spacer so that heat generated inside the motor can be efficiently transferred to the outside of the case.

15 Claims, 9 Drawing Sheets

AXIAL FLOW FAN

BACKGROUND OF THE INVENTION

1. Field of the Invention

The present invention relates to an axial flow fan, and more particularly, to an axial flow fan that is suitable for use as a cooling device for cooling electronic equipment.

2. Description of the Related Art

In recent years, an increased amount of heat is generated from apparatuses such as personal computers and servers as the capabilities of constituent electronic components are improved. Servers, in particular, contain a number of electronic components within relatively small housings, and thus the temperature within the housings rises significantly. Since normal operating temperature ranges are defined for many of the electronic components, the electronic components are unable to fulfill their functions properly outside their temperature ranges. For this reason, a cooling device with a high cooling performance is necessary in order to cool the electronic components. As such a cooling device, axial flow fans are conventionally used.

Meanwhile, due to the reduction in size of the apparatuses such as personal computers and servers in recent years, a plurality of electronic components are densely arranged within the housings of such apparatuses. The cooling devices for cooling the housings are therefore required to be reduced in size while ensuring a large air volume. As a possible measure, a large air volume is obtained by rotating the motor of a conventional axial flow fan at a high speed.

In order to rotate a motor at a high speed, it is necessary to apply a high voltage to the coils in the motor, or to pass a high current through the coils. However, the method of applying a high voltage to the coils necessitates a booster circuit for raising the supply voltage, which leads to an increase in costs. The method of passing a high current through the coils brings about an increase in heat generated in the coils, which leads to lowering the motor efficiency.

SUMMARY OF THE INVENTION

In order to overcome the problems described above, preferred embodiments of the present invention provide an axial flow fan including a motor having a shaft, a rotor magnet arranged concentrically with the shaft to rotate therewith, a stator including a plurality of magnetic pole teeth arranged to radially oppose the rotor magnet, and a plurality of coils each defined by a wound conductive wire therearound, and a bearing mechanism arranged to support the shaft with respect to the stator in a rotatable manner; an impeller arranged at an upper axial end of the stator to rotate with the shaft; a case having a tubular portion housing therein the stator, and a bottom portion arranged below the rotor magnet and including a plurality of through holes; and a substrate arranged to connect end portions of the coils; wherein the substrate is arranged below the bottom portion with an axial space therebetween.

According to another preferred embodiment of the present invention, the axial flow fan includes a motor having a shaft, a rotor magnet arranged concentrically with the shaft to rotate therewith, a stator including a plurality of magnetic pole teeth arranged to radially oppose the rotor magnet, and a plurality of coils each defined by a wound conductive wire therearound; and a bearing mechanism arranged to support the shaft with respect to the stator in a rotatable manner; an impeller arranged at an upper axial end of the stator to rotate with the shaft; a case having a tubular portion housing therein the stator, and a bottom portion arranged below the rotor magnet and including a plurality of through holes; and a substrate arranged to connect end portions of the coils; wherein the substrate is arranged at the bottom portion; a portion of the bottom portion includes an opposing surface arranged to axially oppose the substrate with a gap therebetween; and the opposing surface includes the plurality of through holes.

According to another preferred embodiment of the present invention, the axial flow fan includes a motor having a shaft, a rotor magnet arranged concentrically with the shaft to rotate therewith, a stator including a plurality of magnetic pole teeth arranged to radially oppose the rotor magnet, and a plurality of coils each defined by a wound conductive wire therearound, and a bearing mechanism arranged to support the shaft with respect to the stator in a rotatable manner; an impeller arranged at an upper axial end of the stator to rotate with the shaft; a case having a tubular portion housing therein the stator, and a bottom portion arranged below the rotor magnet and including a plurality of through holes; and a substrate arranged to connect end portions of the coils; wherein the substrate is arranged axially below the bottom portion; and the tubular portion includes a plurality of through holes arranged axially below the stator.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Referring to FIGS. 1 through 9, preferred embodiments of the present invention will be described in detail. It should be noted that in the explanation of the preferred embodiments of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel or substantially parallel to a rotation axis, and a radial direction indicates a direction perpendicular or substantially perpendicular to the rotation axis.

First Preferred Embodiment

Figure 1:
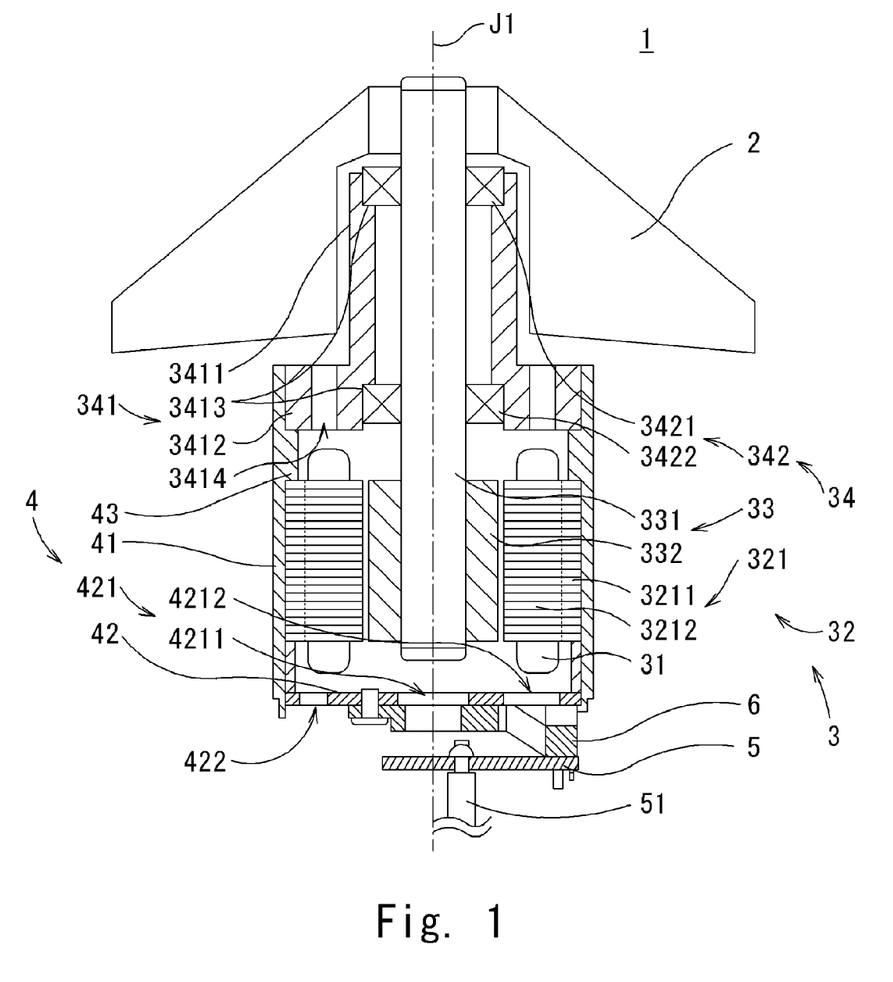
FIG. 1 is a longitudinal cross-sectional view showing the configuration of an axial flow fan according to a first preferred embodiment of the present invention.

A description is provided of an axial flow fan 1 according to a first preferred embodiment of the present invention. FIG. 1 shows a longitudinal cross-section of the axial flow fan 1 according to the first preferred embodiment of the present invention, taken along a plane including a central axis J1.

As shown in FIG. 1, the axial flow fan 1 includes an impeller 2, a motor 3, a case 4, a substrate 5, and lead wires 51. The impeller 2 rotates to produce an air flow along the central axis J1. The motor 3 is coupled to the impeller 2 to rotate the impeller 2 about the central axis J1. The case 4 holds the outer periphery of the motor 3. The substrate 5 connects ends of coils 31 that are drawn out from the motor 3. The lead wires 51 are connected to the substrate 5 and are drawn to the outside. The axial flow fan 1 according to the present preferred embodiment rotates at a rotation rate of about 10,000 rpm or higher to obtain a large air volume and is suitable as, e.g., a cooling device for cooling an apparatus such as a personal computer or a server. In the following description, although the impeller 2 side is described as an upper side and the motor 3 side as a lower side along the central axis J1 for convenience sake, the central axis J1 need not necessarily be coincident with the direction of gravitational force.

The motor 3 is preferably an inner-rotor three-phase brushless motor and includes a stator 32, a rotor 33, and a bearing mechanism 34. The rotor 33 is supported by the bearing mechanism 34 relative to the stator 32 in a rotatable manner around the central axis J1.

The rotor 33 includes a shaft 331 that extends along the central axis J1, and a substantially cylindrical rotor magnet 332 that is fixed on the outer periphery of the shaft 331.

The stator 32 has its inner peripheral surface radially opposing the outer peripheral surface of the rotor magnet 332. The stator 32 includes a stator core 321 having an annular core back 3211 with a plurality of magnetic pole teeth 3212 protruding radially inward from the core back 3211. Conductive wires 311 are wound around the magnetic pole teeth 3212 of the stator core 321, thereby forming the coils 31.

According to the present preferred embodiment, the conductive wires 311 are wound around division cores that are divided by each magnetic pole tooth 3212 to form the coils 31, and the coils 31 are arranged annularly into the stator 32. The space factor of the conductive wires 311 can be increased in the structure using the division cores, so that the efficiency of the motor 3 can be enhanced. Particularly, as in the axial flow fan 1 according to the present preferred embodiment, in the case where a high current needs to be applied to the coils 31 so as to rotate the impeller 2 at a high speed, and conductive wires 311 having a large diameter are therefore used, a winding operation would be difficult to perform and the space factor of the conductive wires is less in a stator core that does not use division cores. However, the use of the stator core 321 using division cores facilitates the winding operation even with the conductive wires 311 have a large diameter, and the space factor is thereby improved.

Case

Figure 2:
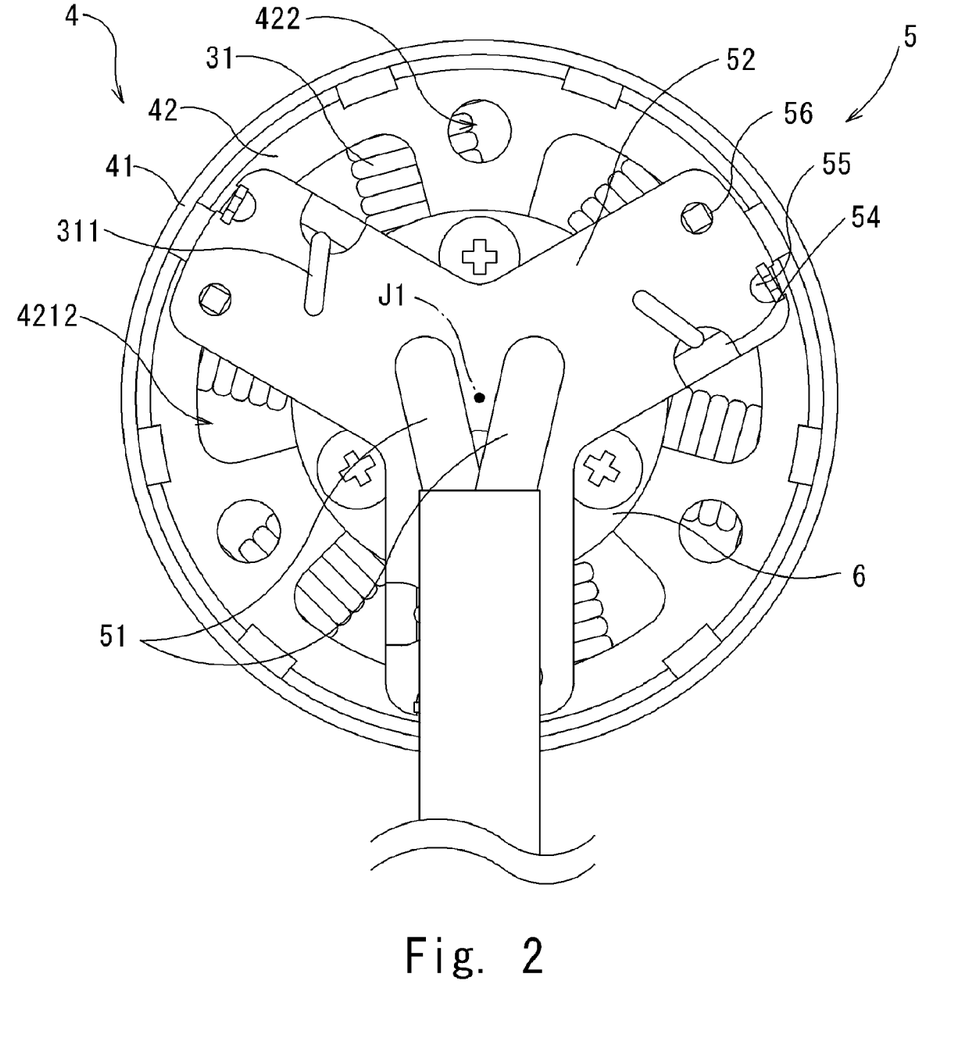
FIG. 2 is a bottom view showing a portion of the axial flow fan according to the first preferred embodiment of the present invention.

FIG. 2 is a bottom view of the axial flow fan 1 excluding the impeller 2. The stator 32 is housed in the case 4 having a tubular portion 41 and a bottom portion 42. The tubular portion 41 holds the outer peripheral surface of the stator core 321, and the bottom portion 42 is provided at a position axially below the lower end of the shaft 331. In the present preferred embodiment, the stator core 321 is press fitted in the tubular portion 41 and thereby fixed, and the bottom portion 42 is fixed at the lower end of the tubular portion 41 through caulking. Also, as shown in FIG. 2, the bottom portion 42 has a plurality of through holes 421 and a plurality of attachment holes 422. In the present preferred embodiment, the through holes 421 preferably include a bottom central through hole 4211 at the center of the bottom portion 42 and three circumferentially equally-spaced bottom through holes 4212 on the radially outer side of the bottom central through hole 4211. Each attachment hole 422 is provided between the neighboring bottom through holes 4212 and is used for attaching the axial flow fan 1 to an external device (not shown).

An annular protruding portion 43 is provided on the inner peripheral surface of the tubular portion 41 so as to protrude radially inward. The protruding portion 43 meets the upper surface of the stator core 321 to axially position the stator core 321. With this structure, the stator core 321 can be easily positioned axially without using a member such as a jig that is used exclusively for assembly of the motor 3. Further, the upper surface of the protruding portion 43 meets the lower end surface of a bearing holding portion 341, which will be described below, in such a way that the bearing holding portion 341 is located axially. The protruding portion 43 need not necessarily be formed in an annular shape, and a plurality of protruding portions may be spaced along the circumferential direction.

Bearing Mechanism

Figure 3:
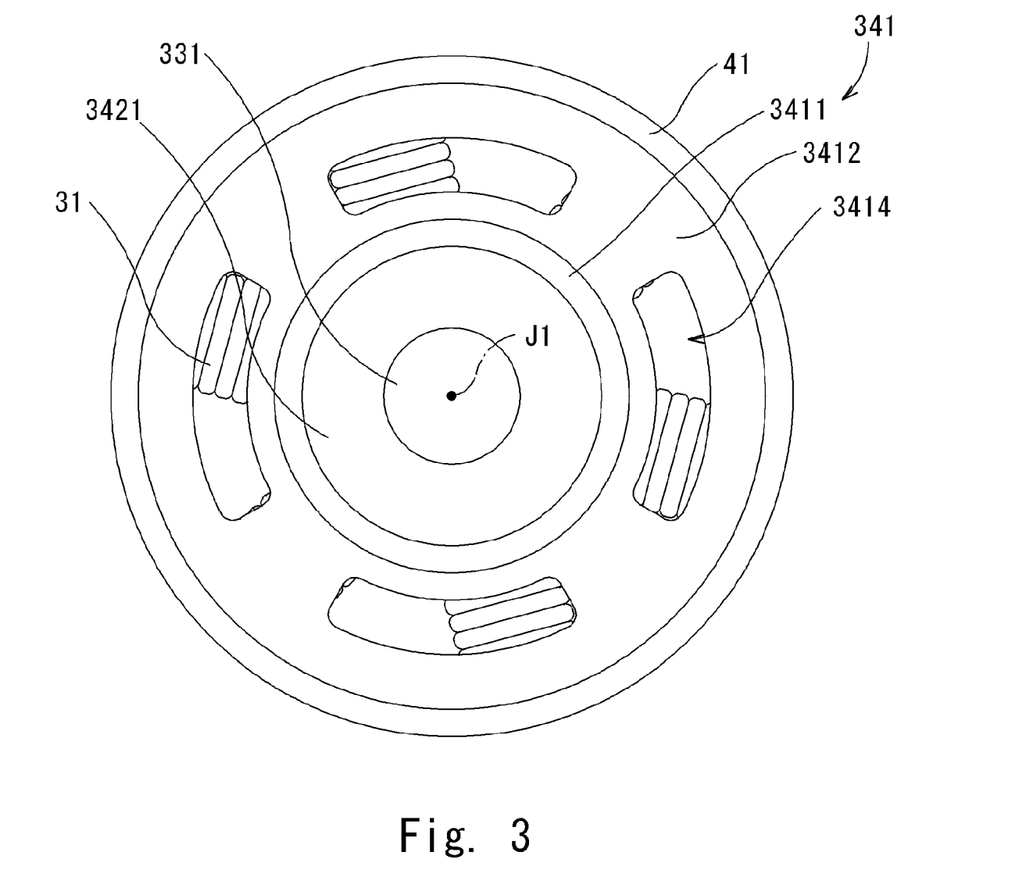
FIG. 3 is a top view showing a portion of the axial flow fan according to the first preferred embodiment of the present invention.

FIG. 3 is a top view of the axial flow fan 1 excluding the impeller 2. The bearing mechanism 34 includes a pair of ball bearings 342 and the substantially cylindrical bearing holding portion 341. The pair of ball bearings 342 is disposed above the rotor magnet 332. The bearing holding portion 341 supports the outer peripheries of the ball bearings 342. The ball bearings 342 that make up the pair are spaced apart from each other in the axial direction. Of the pair, the ball bearing 342 disposed on the axially upper side is referred to as an upper ball bearing 3421, and the ball bearing 342 on the axially lower side is referred to as a lower ball bearing 3422. The bearing holding portion 341 includes a cylindrical portion 3411 and a substantially disk-shaped flange portion 3412. The cylindrical portion 3411 supports the outer peripheries of the ball bearings 3421 and 3422. The flange portion 3412 spreads out radially from the lower end of the cylindrical portion 3411. The lower end surface of the flange portion 3412 meets the upper surface of the protruding portion 43 and is fixed to the case 4. The cylindrical portion 3411 is provided with recessed portions 3413 on the upper and lower ends. The upper and lower ball bearings 3421 and 3422 are fixed within the recessed portions 3413 through any one of press fitting, adhesive bonding, and insertion fitting, for example. As shown in FIG. 3, the flange portion 3412 is provided with a plurality of through holes 3414 that penetrate in the axial direction at equal or substantially equal intervals in the circumferential direction. These through holes 3414 desirably have a circular or substantially circular arcuate opening shape that is longer in the circumferential direction.

Impeller

The impeller 2 is fixed on the upper end of the shaft 331. The impeller 2 has a diameter larger than the outer diameter of the case 4. The impeller 2 rotates with the shaft 331 so that an air flow is produced along the axial direction from the upper side toward the lower side. The produced air flow partially goes into the case 4 through the through holes 3414 provided in the flange portion 3412 of the bearing holding portion 341, and past the interior of the motor 3 inside the case 4 to come out of the case 4 through the through holes 421 provided in the bottom portion 42 of the case 4. With this structure, the air flow that is produced by the rotation of the impeller 2 carries the heat generated in the stator 32 and discharges the heat to the outside of the case 4. Accordingly, the stator 32 can be cooled effectively.

Substrate

The substrate 5 is attached under the bottom portion 42 of the case 4 with a spacer 6, which will be described below, interposed in between the substrate 5 and the case 4. Preferably, the substrate 5 has a substantially Y-shape with three circumferentially equally-spaced projections 52 projecting radially outward. The substrate 5 is approximately the same in outermost diameter as the case 4. The number of projections 52 corresponds to the number of phases of the motor 3. The lead wires 51 to be connected to, e.g., an external power supply (not shown) are soldered to the substrate 5 in the vicinity of the center. The lead wires 51 are larger in diameter than the conductive wires 311 that form the coils 31. On the substrate 5, the ends of the coils 31 are also soldered to each of the three projections 52 at positions radially outside the portions where the lead wires 51 are connected. The ends of the coils 31 connected to the substrate 5 are electrically connected to the lead wires 51 through a wiring pattern (not shown) formed on the substrate 5. With this structure, the force applied to the lead wires 51 is not transmitted directly to the conductive wires 311, so that the conductive wires 311 can be prevented from being broke by the external force.

In the present preferred embodiment, the motor 3 is a three-phase brushless motor, and the coils 31 are connected in a delta connection configuration. Therefore, each of the three projections 52 is connected with two ends of the coils 31 that are different in phase from each other. That is, a first end of a U-phase coil 31 and a second end of a W-phase coil 31, for example, are soldered to one projection 52.

A plurality of guide portions 54 are provided in each projection 52 of the substrate 5 so as to position the end of each coil 31 to be connected to the substrate 5. The guide portions 54 are formed by making notches at the side surfaces of the projections 52. The ends of the coils 31 are guided by way of the guide portions 54 onto the wiring pattern. In this manner, the ends of the coils 31 can easily be connected with the substrate 5, and faulty wiring can be prevented at the same time.

The substrate 5 is disposed in axial alignment with the through holes 421 of the bottom portion 42. More specifically, the central portion of the substrate 5 is axially aligned with the bottom central through hole 4211, and the three projections 52 of the substrate 5 are axially aligned with the three bottom through holes 4212, respectively. At this point, the attachment holes 422 provided in the bottom portion 42 and the substrate 5 are in a positional relationship where they do not overlap with one another in the axial direction.

Spacer

Figure 4:
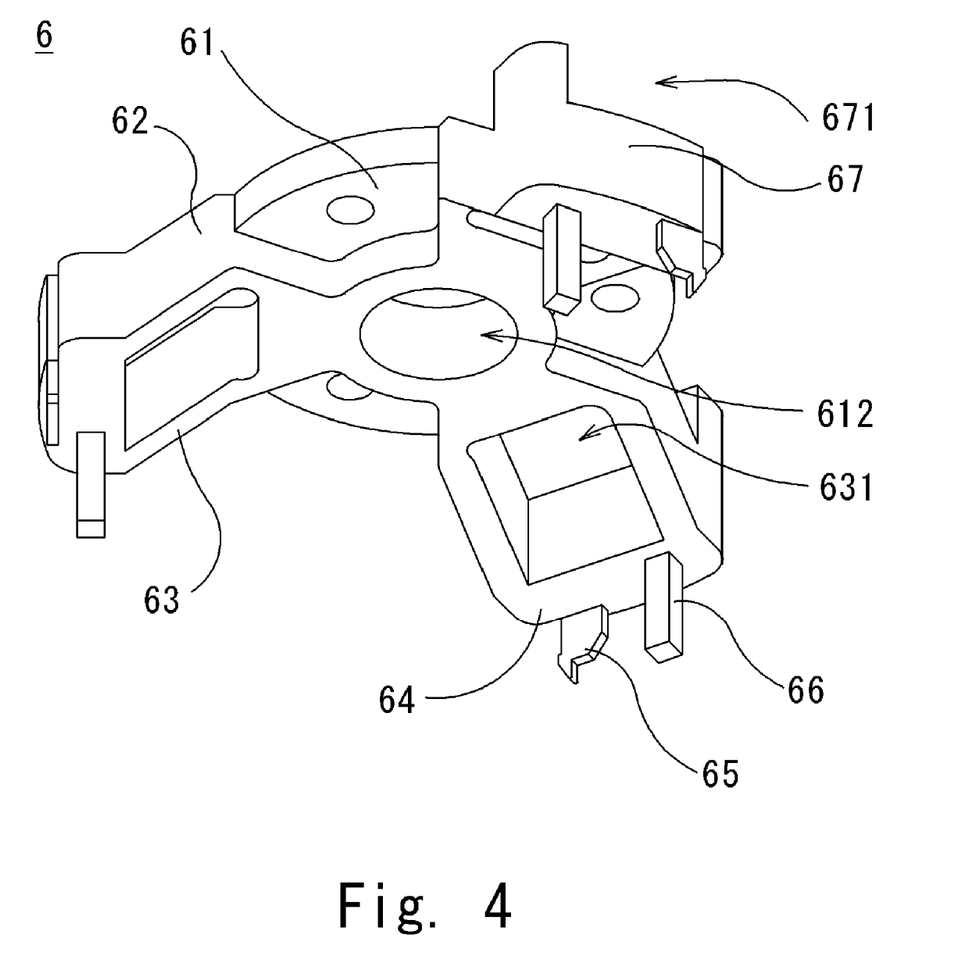
FIG. 4 is a perspective view of a spacer according to the first preferred embodiment of the present invention.

FIG. 4 is a perspective view of the spacer 6. The spacer 6 is preferably formed from a resin material or the like and is provided between the bottom portion 42 and the substrate 5. As shown in FIG. 4, the spacer 6 includes a substantially disk-shaped base 61 and three circumferentially equally-spaced projections 62. The base 61 is attached to the bottom portion 42 by fixing members such as screws. The projections 62 project radially outward from the base 61. Each projection 62 has a slanted surface 63 that slants downward from the base 61 as it extends radially outward, and a substrate placing surface 64 that is continuous from the slanted surface 63 and is substantially parallel with the bottom portion 42. The slanted surfaces 63 are provided with through holes 631 that penetrate in the axial direction. The substrate 5 is fixed to the substrate placing surfaces 64. With this structure, the substrate 5 is disposed spaced apart from the bottom portion 42 in the axial direction.

The spacer 6 has elastically deformable hooks 65 provided on the substrate placing surfaces 64 of the projections 62. The hooks 65 are engaged with engaging portions 55 that are provided on the outer peripheries of the projections 52 of the substrate 5 to secure the substrate 5 to the spacer 6. In addition, pins 66 are press fitted in the substrate placing surfaces 64 of the spacer 6 at positions on the radially inner side of the hooks 65. The pins 66 are inserted into through holes 56 that are provided in the substrate 5 on the radially inner side of the engaging portions 55 and on the radially outer side of the positions where the ends of the coils 31 are connected. The pins 66 are then soldered to the substrate 5. With this structure, the spacer 6 holds the substrate 5. As described above, the spacer 6 can hold the substrate 5 firmly through two securing devices, i.e., one using the hooks 65 and one using the pins 66.

The base 61 of the spacer 6 is provided, at the center thereof, with a central through hole 612 that penetrates in the axial direction. The bottom central through hole 4211 and the central through hole 612 in the base 61 are aligned with each other in the axial direction. The through holes 631 provided in the slanted surfaces 63 and the bottom through holes 4212 are disposed in axial alignment with one another. That is, the projections 62 of the spacer 6 are disposed in axial alignment with the bottom through holes 4212. With this structure, the air flow that has passed through the interior of the motor 3 comes out through the through holes 421 in the bottom portion 42, and exits the case 4 to the outside through the central through hole 612 provided in the spacer 6 and the through holes 631 provided in the slanted surfaces 63. As a result, the spacer 6 does not cut off the air flow, and the interior of the motor 3 can thus be cooled efficiently.

Openings 671 are provided in outer peripheral surfaces 67 of the projections 62 of the spacer 6. With this structure, the air flow that has come out of the through holes 421 in the bottom portion 42 partially passes through the openings 671 whereby the interior of the motor 3 can be further cooled efficiently. Moreover, this structure allows the air flow to be distributed so as to decrease the air flow that that hits the substrate 5, so that the force applied to the substrate 5 is reduced, and the spacer 6 and the substrate 5 can be secured to each other even more reliably.

Second Preferred Embodiment

Figure 5:
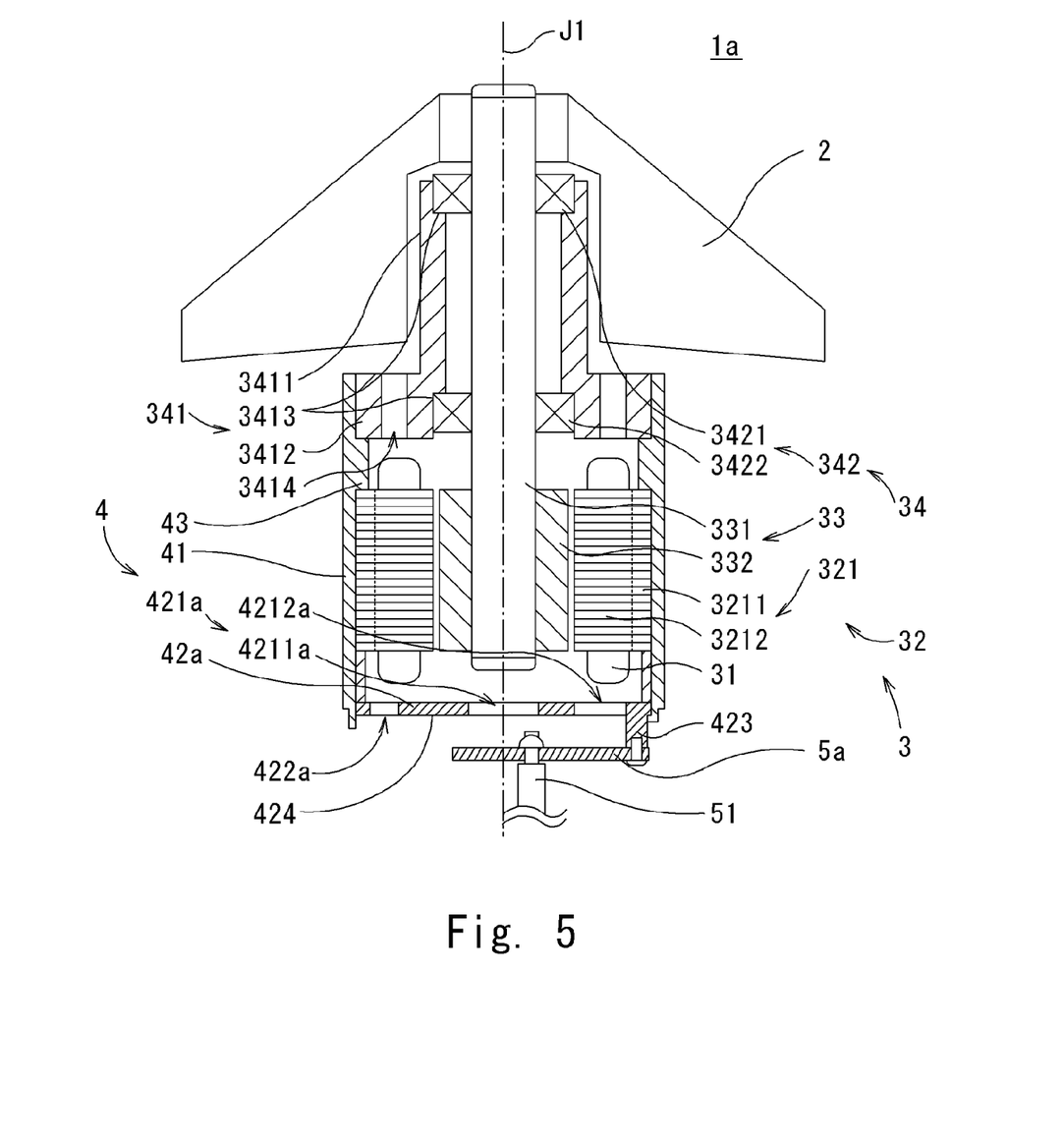
FIG. 5 is a longitudinal cross-sectional view showing the configuration of an axial flow fan according to a second preferred embodiment of the present invention.
Figure 6:
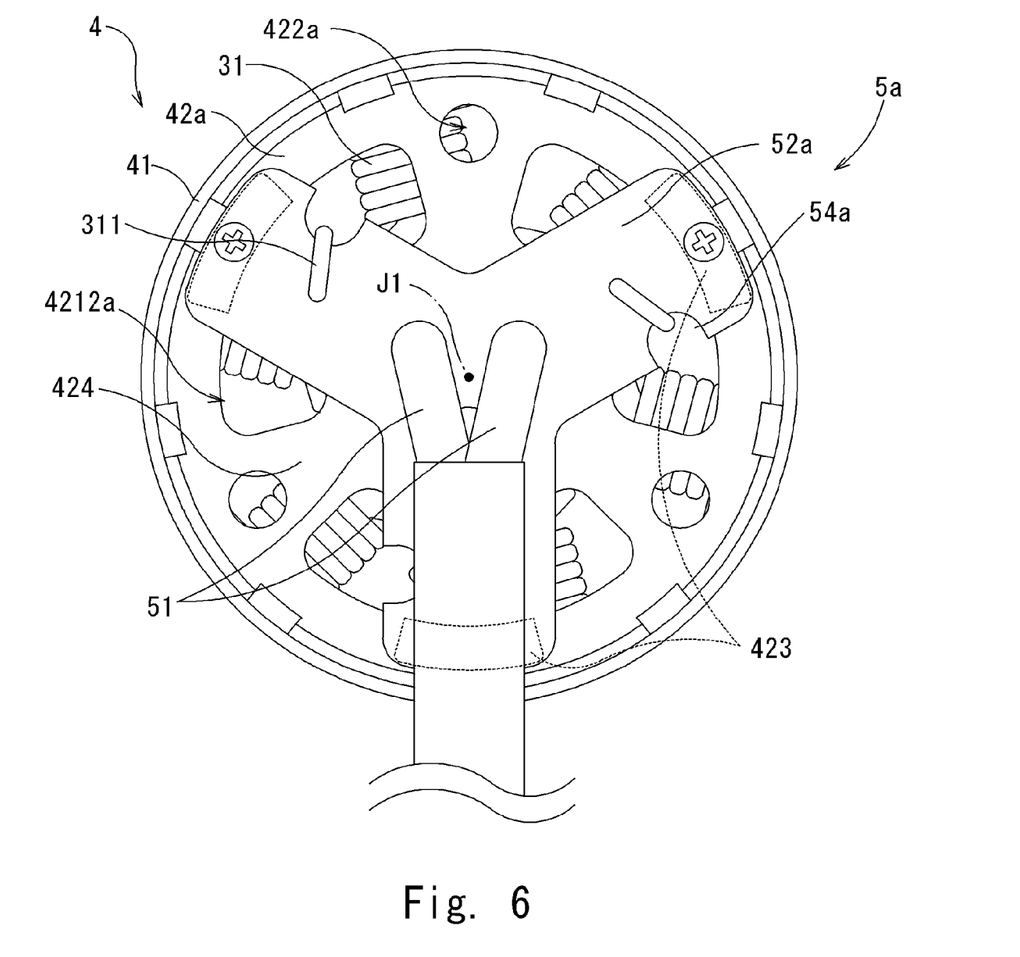
FIG. 6 is a bottom view showing a portion of the axial flow fan according to the second preferred embodiment of the present invention.

Next, a description is provided below for an axial flow fan 1a according to a second preferred embodiment of the present invention. FIG. 5 shows a longitudinal cross-section of the axial flow fan 1a according to the second preferred embodiment of the present invention, taken along a plane including the central axis J1. FIG. 6 is a bottom view of the axial flow fan 1a excluding the impeller 2. As shown in FIG. 5, in the axial flow fan 1a according the present preferred embodiment, a substrate 5a is fixed to a bottom portion 42a without using the spacer 6 shown in FIGS. 1 and 4. The other elements are the same as those shown in FIG. 1, and the same reference numerals are used in the following description.

As shown in FIGS. 5 and 6, three projections 423 (indicated with broken lines in FIG. 6) that project downward are provided circumferentially at equal intervals on the bottom portion 42a at the outer peripheral side. The projections 423 preferably have a circular or substantially circular arcuate shape that is longer in the circumferential direction. The substrate 5a is disposed under the bottom portion 42a and is attached to the projections 423 of the bottom portion 42a with fixing members such as screws. The structure of the substrate 5a is the same as that of the substrate 5 shown in FIG. 3 other than the portions fixed to another member. The bottom portion 42a has an opposing surface 424 that axially opposes the substrate 5a with a gap therebetween. The opposing surface 424 has a plurality of through holes 421a, and a plurality of attachment holes 422a used for attaching the axial flow fan 1a to an external device (not shown). The through holes 421a include a bottom central through hole 4211a at the center of the bottom portion 42a and three circumferentially equally-spaced bottom through holes 4212a that are provided on the radially outer side of the bottom central through hole 4211a. As shown in FIG. 6, the through holes 421a and the substrate 5a are axially aligned with one another.

With the above structure, the air flow generated by the rotation of the impeller 2 partially flows into the case 4 through the through holes 3414 provided in the flange portion 3412 of the bearing holding portion 341, past the interior of the motor 3 inside the case 4, and outside of the case 4 through the through holes 421a provided in the bottom portion 42a of the case 4. The gap between the bottom portion 42a and the substrate 5a keeps the substrate 5a from hindering the air flow, thereby allowing the interior of the motor 3 to be cooled efficiently.

Third Preferred Embodiment

Figure 7:
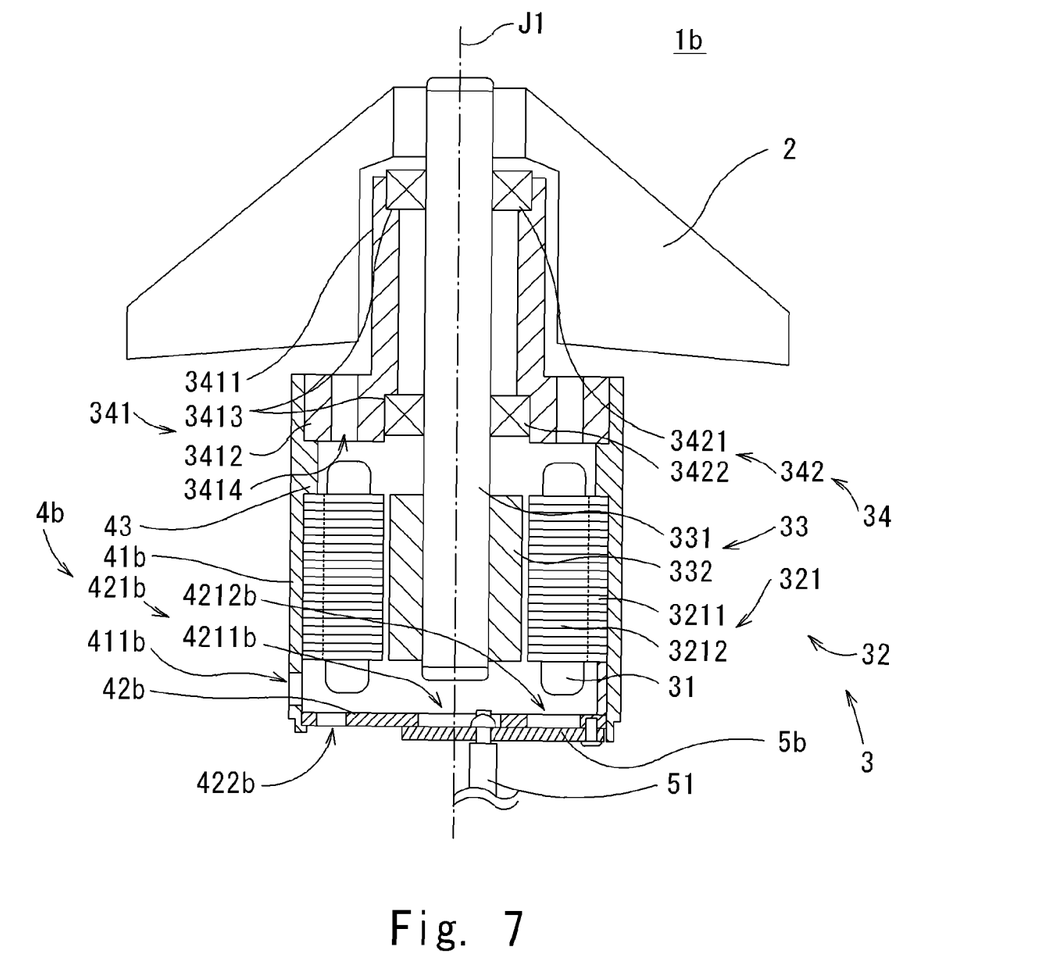
FIG. 7 is a longitudinal cross-sectional view showing the configuration of an axial flow fan according to a third preferred embodiment of the present invention.
Figure 8:
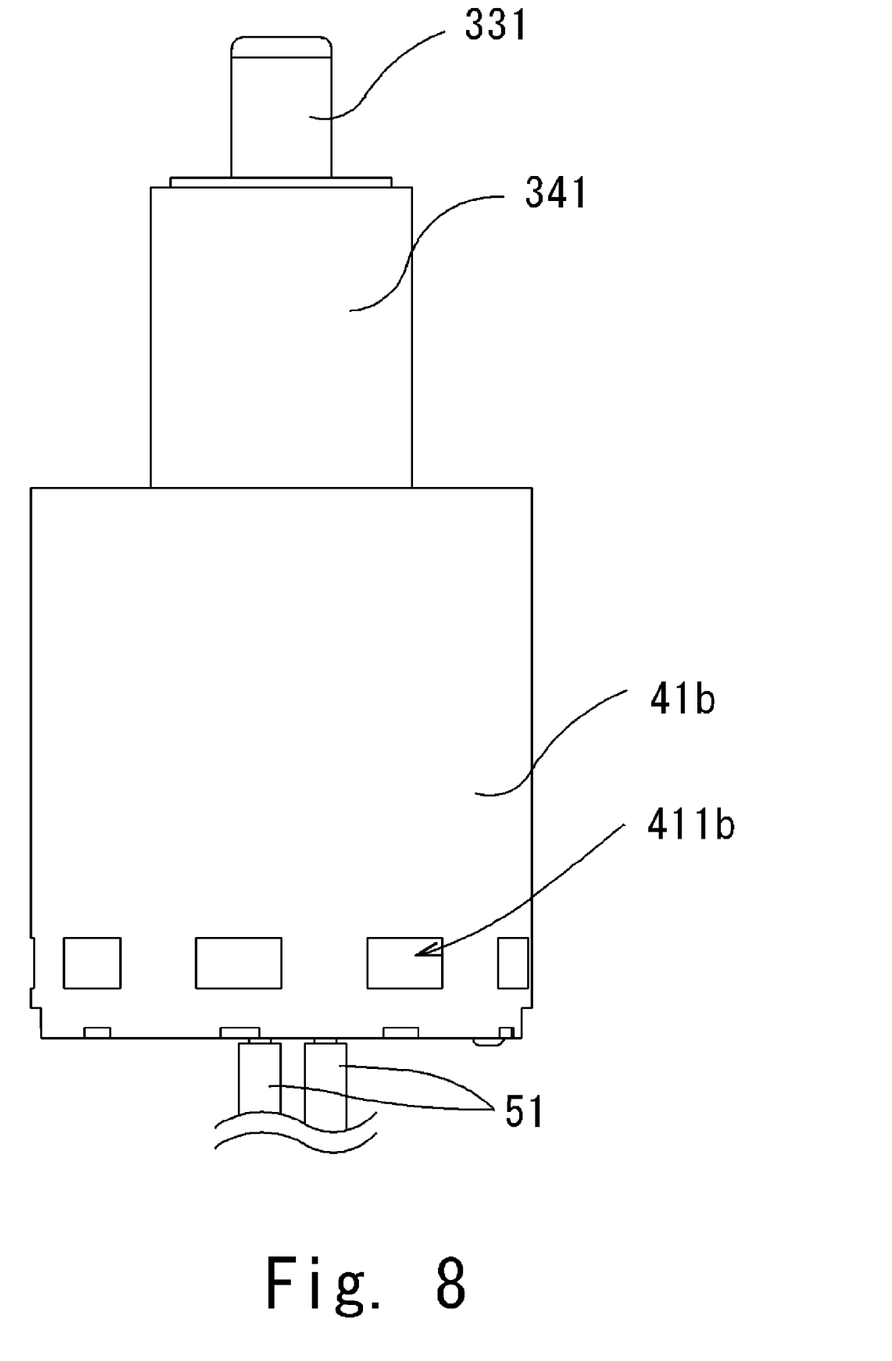
FIG. 8 is a side view showing the appearance of a portion of the axial flow fan according to the third preferred embodiment of the present invention.
Figure 9:
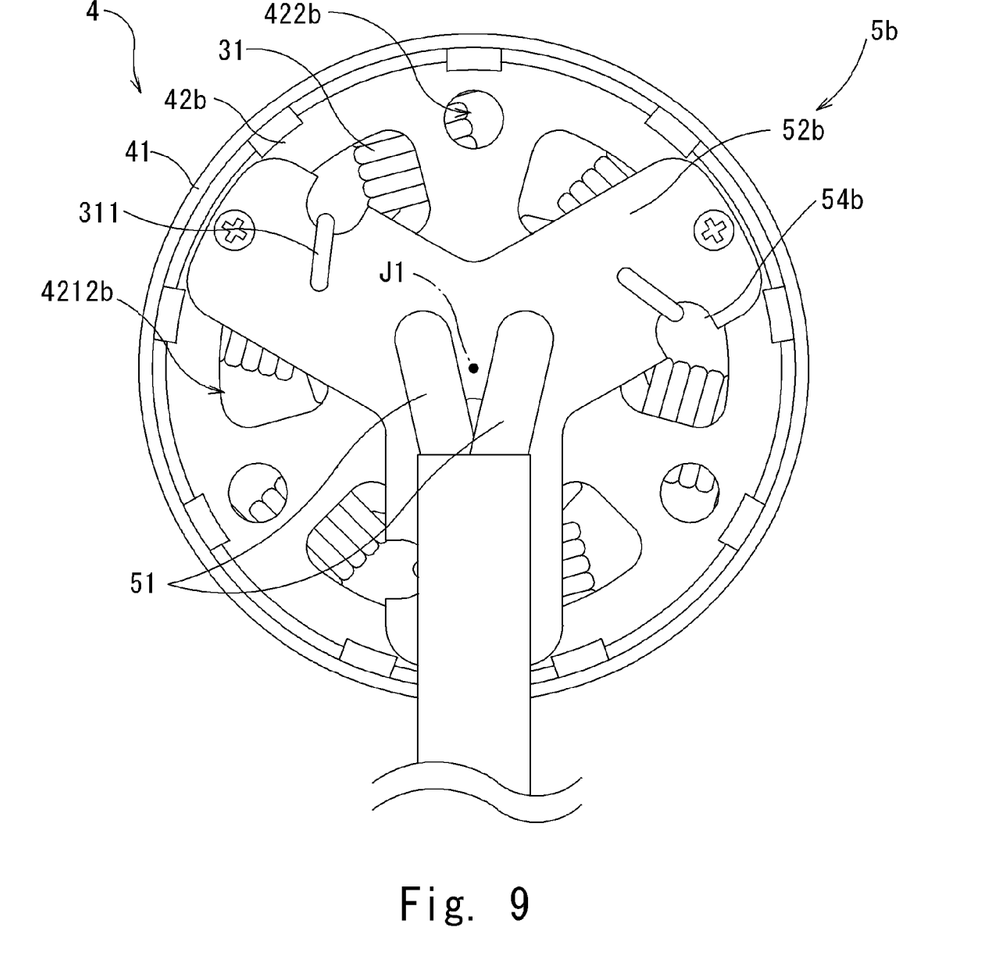
FIG. 9 is a bottom view showing a portion of the axial flow fan according to the third preferred embodiment of the present invention.

Next, a description is provided for an axial flow fan 1b according to a third preferred embodiment of the present invention. FIG. 7 shows a longitudinal cross-section of the axial flow fan 1b according to the third preferred embodiment of the present invention, taken along a plane including the central axis J1. FIG. 8 is a side view of the appearance of the axial flow fan 1b excluding the impeller 2. FIG. 9 is a bottom view of the axial flow fan 1b excluding the impeller 2. As shown in FIGS. 7 and 8, in the axial flow fan 1b according to the present preferred embodiment, a substrate 5b is fixed to a bottom portion 42b without using the spacer 6 shown in FIGS. 1 and 4, and a plurality of through holes 411b are provided in a tubular portion 41b of a case 4b. The bottom portion 42b has a plurality of through holes 421b, including a central hole 4211b and bottom holes 4212b, and a plurality of attachment holes 422b. The other elements are the same as those of FIG. 1, and the same reference numerals are used in the following description.

As shown in FIGS. 7 and 8, the substrate 5b is fixed to the bottom portion 42b of the case 4b with fixing members such as screws, and the through holes 411b are provided in the tubular portion 41b. The bottom portion 42b and the substrate 5b have the same structure as shown in FIGS. 1 and 3, and through holes 421b in the bottom portion 42b are aligned axially with the substrate 5b. The tubular portion 41b has the plurality of through holes 411b at positions below the stator 32. The through holes 411b are provided circumferentially at equal intervals.

With this structure, the air flow produced by the rotation of the impeller 2 partially flows into the case 4b through the through holes 3414 provided in the flange portion 3412 of the bearing holding portion 341, past the interior of the motor 3 inside the case 4b, and outside of the case 4b through the through holes 411b provided in the tubular portion 41b of the case 4b. As shown in FIG. 9, however, since the through holes 421b provided in the bottom portion 42b are almost closed by the substrate 5b, the through holes 421b are unlikely to be able to efficiently serve as ventilation holes. However, the through holes 411b provided in the tubular portion 41b serve as ventilation holes, and so the interior of the motor 3 can be efficiently cooled.

While preferred embodiments of the present invention have been described above, it is to be understood that variations and modifications will be apparent to those skilled in the art without departing the scope and spirit of the present invention. The scope of the present invention, therefore, is to be determined solely by the following claims.

For instance, each of the motors 3 of the axial flow fans 1, 1a, and 1b according to the foregoing first to third preferred embodiments need not necessarily be a three-phase brushless motor, and it may be a polyphase motor such as a two-phase motor or a four or more phase motor. In this case, the number of respective projections 52, 52a, 52b of the substrates 5, 5a, and 5b is preferably equal to the number of phases. The guide portions 54a, 54b provided in the projections 52a, 52b, position the end of each coil 31 to be connected to the substrate 5a, 5b, respectively. In the first preferred embodiment, the number of projections 62 of the spacer 6 is also preferably equal to the number of phases.

In the spacer 6 of the axial flow fan 1 according to the first preferred embodiment, although the openings 671 in the outer peripheral surfaces 67 are made by cutting out a portion from each outer peripheral surface 67, the openings 671 may be provided as through holes that penetrate in the radial direction.

In the axial flow fan 1a according to the second preferred embodiment, the projections are provided on the bottom portion 42a. However, the substrate 5a may be bent to provide gaps between the bottom portion 42a and portions of the substrate 5a.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An axial flow fan comprising:
   a motor including:
      a shaft;
      a rotor magnet arranged concentrically with the shaft to rotate therewith;
      a stator including a plurality of magnetic pole teeth arranged to radially oppose the rotor magnet, and a plurality of coils each defined by a wound conductive wire therearound; and
      a bearing mechanism arranged to support the shaft with respect to the stator in a rotatable manner;
   an impeller arranged at an upper axial end of the stator to rotate with the shaft;
   a case including a tubular portion housing therein the stator, and a bottom portion arranged below the rotor magnet and including a plurality of through holes; and
   a substrate arranged to connect end portions of the coils; wherein
   the substrate is arranged below the bottom portion with an, axial space therebetween;
   a spacer is arranged axially below the bottom portion, and the substrate is attached to the spacer;

the spacer includes at least one through hole arranged to penetrate the spacer in an axial direction, the at least one through hole being arranged between the bottom portion and the substrate;

the motor is a polyphase motor, the substrate includes projections projecting radially outwardly, and a number of phases of the motor corresponds to a number of the projections; and the bottom portion includes at least one attachment hole arranged at an area of the bottom portion that is located circumferentially between a pair of the projections, the at least one attachment hole being separate from the plurality of through holes.

2. The axial flow fan according to claim 1, wherein the at least one through hole includes a plurality of through holes arranged to penetrate the spacer in an axial direction.

3. The axial flow fan according to claim 2, wherein at least one of the through holes of the bottom portion and at least one of the through holes of the spacer are approximately aligned with one another in the axial direction.

4. The axial flow fan according to claim 1, wherein the spacer includes at least one opening at an outer peripheral surface thereof.

5. The axial flow fan according to claim 1, wherein the spacer includes a slanted surface which is slanted downwardly and radially outwardly.

6. The axial flow fan according to claim 1, wherein the substrate is approximately aligned with the through holes of the bottom portion in the axial direction.

7. The axial flow fan according to claim 1, wherein the substrate is connected to a plurality of lead wires which are connected to the coils via a wiring pattern on the substrate.

8. The axial flow fan according to claim 7, wherein a diameter of the lead wires is greater than a diameter of the conductive wire.

9. The axial flow fan according to claim 7, wherein the rotor magnet is arranged at a radially inner side of the stator, end portions of the coils are connected to outer peripheral sides of the substrate, and the lead wires are connected to the substrate at a substantially central area thereof.

10. The axial flow fan according to claim 1, wherein the substrate includes a plurality of guide portions arranged to position end portions of the coils.

11. The axial flow fan according to claim 1, wherein an outermost diameter of the substrate is approximately the same as an outer diameter of the case.

12. The axial flow fan according to claim 1, wherein the motor is a three phase motor, and the coils are connected in a delta-shape.

13. The axial flow fan according to claim 1, wherein the bearing mechanism is arranged axially above the rotor magnet.

14. The axial flow fan according to claim 1, wherein end portions of each of the plurality of the coils are arranged to be connected to the substrate through the at least one through hole.

15. The axial flow fan according to claim 1, wherein the spacer is made from a resin material.

* * * * *